(12) United States Patent
Fischbach et al.

(10) Patent No.: US 12,352,180 B2
(45) Date of Patent: Jul. 8, 2025

(54) COMPRESSOR ROTOR DESTACKING APPARATUS AND METHOD

(71) Applicant: RTX Corporation, Farmington, CT (US)

(72) Inventors: Mitchell J. Fischbach, Pine Mountain Valley, GA (US); Jacob Barnes, Columbus, GA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/538,423

(22) Filed: Dec. 13, 2023

(65) Prior Publication Data

US 2025/0198311 A1    Jun. 19, 2025

(51) Int. Cl.
*F01D 25/28* (2006.01)
*B23P 19/02* (2006.01)
*B23P 19/027* (2006.01)

(52) U.S. Cl.
CPC .......... *F01D 25/285* (2013.01); *B23P 19/025* (2013.01); *B23P 19/027* (2013.01); *F05D 2230/70* (2013.01); *F05D 2240/24* (2013.01)

(58) Field of Classification Search
CPC ..... B23P 19/025; B23P 19/027; F01D 25/285
See application file for complete search history.

(56) References Cited

U.S. PATENT DOCUMENTS

| | | | |
|---|---|---|---|
| 5,473,883 A | 12/1995 | Naudet | |
| 8,776,347 B2 | 7/2014 | Virkler et al. | |
| 9,802,302 B1 | 10/2017 | Colson | |
| 10,968,779 B2 | 4/2021 | Tailpied et al. | |
| 2014/0000084 A1* | 1/2014 | Virkler | B25B 27/20 29/426.6 |
| 2016/0069259 A1 | 3/2016 | Sandoval | |
| 2016/0146103 A1 | 5/2016 | Muldoon | |
| 2022/0048647 A1 | 2/2022 | Henriksen et al. | |
| 2023/0001524 A1* | 1/2023 | Jiang | B25B 27/24 |

FOREIGN PATENT DOCUMENTS

| | | | | |
|---|---|---|---|---|
| CN | 110340848 A | | 10/2019 | |
| CN | 113263476 A | * | 8/2021 | ............ B23P 19/025 |
| CN | 114571401 A | | 6/2022 | |
| CN | 115805556 A | | 3/2023 | |
| KR | 101869650 B1 | | 6/2018 | |

OTHER PUBLICATIONS

Extended European Seach Report for EP Application No. 24219981.8, dated May 13, 2025, pp. 1-10.

* cited by examiner

*Primary Examiner* — Christopher J. Besler
(74) *Attorney, Agent, or Firm* — CANTOR COLBURN LLP

(57) ABSTRACT

A disassembly tool for a rotor assembly of a gas turbine engine includes a plurality of legs configured for installation into a rotor bore of a rotor of the rotor assembly. Each leg includes one or more keys extending radially inwardly toward a center of the rotor bore. A puck is configured for installation into the rotor bore radially inboard of the plurality of legs. The puck includes a groove receptive of the one or more keys to retain the puck to the plurality of legs.

13 Claims, 7 Drawing Sheets

COMPRESSOR ROTOR DESTACKING APPARATUS AND METHOD

BACKGROUND

Exemplary embodiments of the present disclosure pertain to the art of gas turbine engines, and in particular to disassembly of compressor rotor of a gas turbine engine.

During service or repair of gas turbine engines, it is often necessary to disassemble the rotor assembly by unstacking successive rotor stages. The rotor stages are connected to each other via an interference fit at a rotor flange, also known as a snap connection, and application of a high degree of force is necessary to separate the rotor stages. A pneumatic ram is typically utilized to apply a pulling force on one of the stages, while tooling installed to an adjacent stage is used to react the pulling force applied by the pneumatic ram device. The currently utilized tooling can slip or other wise move during operation and may consequently damage the rotor stage. The rotor stages, which are often integral-bladed rotors (IBRs), are costly components and damage resulting from use of the tooling during disassembly may result is the need for extensive repair and/or replacement of the rotor stage. The art would therefore appreciate improved tooling for disassembly of the rotor stages from each other,

BRIEF DESCRIPTION

In one exemplary embodiment, a disassembly tool for a rotor assembly of a gas turbine engine includes a plurality of legs configured for installation into a rotor bore of a rotor of the rotor assembly. Each leg includes one or more keys extending radially inwardly toward a center of the rotor bore. A puck is configured for installation into the rotor bore radially inboard of the plurality of legs. The puck includes a groove receptive of the one or more keys to retain the puck to the plurality of legs.

Additionally or alternatively, in this or other embodiments the one or more keys engage the groove via rotation of the puck in the rotor bore.

Additionally or alternatively, in this or other embodiments each leg of the plurality of legs includes a leg body having a radial inner surface from which the one or more keys extend, a first axial arm extending radially outwardly from the leg body and configured to be positioned at a first axial side of the rotor, and a second axial arm extending radially outwardly from the leg body and configured to be positioned at a second axial side of the rotor opposite the first axial side.

Additionally or alternatively, in this or other embodiments the leg body further includes an axially facing surface extending radially inwardly from the leg body.

Additionally or alternatively, in this or other embodiments the one or more keys are one or more radially-extending pins or one or more circumferentially elongated ribs.

Additionally or alternatively, in this or other embodiments the puck includes a puck axial surface configured to react a force applied via a disassembly force application device.

In another exemplary embodiment, a disassembly system for disassembly of a first rotor of a rotor assembly of a gas turbine engine from an axially adjacent second rotor of the rotor assembly includes a disassembly tool including a plurality of legs configured for installation through a first rotor bore of the first rotor and secured at a second rotor bore of the second rotor. Each leg includes one or more keys extending radially inwardly toward a center of the rotor bore. A puck is configured for installation into the second rotor bore radially inboard of the plurality of legs. The puck includes a groove receptive of the one or more keys to retain the puck to the plurality of legs. A disassembly force application device is operably connected to the first rotor and operably connected to the second rotor at the puck. The disassembly force application device is configured to apply an axial force to remove the first rotor from the second rotor.

Additionally or alternatively, in this or other embodiments the disassembly force application device is a pneumatic ram.

Additionally or alternatively, in this or other embodiments the one or more keys engage the groove via rotation of the puck in the rotor bore.

Additionally or alternatively, in this or other embodiments each leg of the plurality of legs includes a leg body having a radial inner surface from which the one or more keys extend, a first axial arm extending radially outwardly from the leg body and configured to be positioned at a first axial side of the rotor, and a second axial arm extending radially outwardly from the leg body and configured to be positioned at a second axial side of the rotor opposite the first axial side.

Additionally or alternatively, in this or other embodiments the leg body further includes an axially facing surface extending radially inwardly from the leg body.

Additionally or alternatively, in this or other embodiments the one or more keys are one or more radially-extending pins or one or more circumferentially elongated ribs.

Additionally or alternatively, in this or other embodiments the puck includes a puck axial surface configured to react a force applied via the disassembly force application device.

Additionally or alternatively, in this or other embodiments a method of disassembling a first rotor of a rotor assembly from an adjacent second rotor of the rotor assembly includes inserting a plurality of legs through a first rotor bore of the first rotor toward a second rotor bore of the second rotor, and installing the plurality of legs to the second rotor at the second rotor bore. Each leg of the plurality of legs includes one or more keys extending radially inwardly toward a center of the second rotor bore. A puck is installed through the first rotor bore and into the second rotor bore radially inboard of the plurality of legs. The puck includes a groove receptive of the one or more keys. The one or more keys engage into the groove to retain the puck to the plurality of legs.

Additionally or alternatively, in this or other embodiments the puck is rotated in the second rotor bore to engage the one or more keys into the groove.

Additionally or alternatively, in this or other embodiments an axial force is applied to the first rotor and reacts the axial force at the puck, and the first rotor is disengaged from the second rotor via the application of the axial force.

Additionally or alternatively, in this or other embodiments, a first axial arm of each leg of the plurality of legs is positioned at a first axial side of the rotor, and a second axial arm of each leg of the plurality of legs is positioned at a second axial side of the rotor opposite the first axial side.

Additionally or alternatively, in this or other embodiments each leg further includes an axially facing surface extending radially inwardly from the leg.

Additionally or alternatively, in this or other embodiments the one or more keys are one or more pins or one or more circumferentially elongated ribs.

Additionally or alternatively, in this or other embodiments the axial force is applied via a pneumatic ram.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
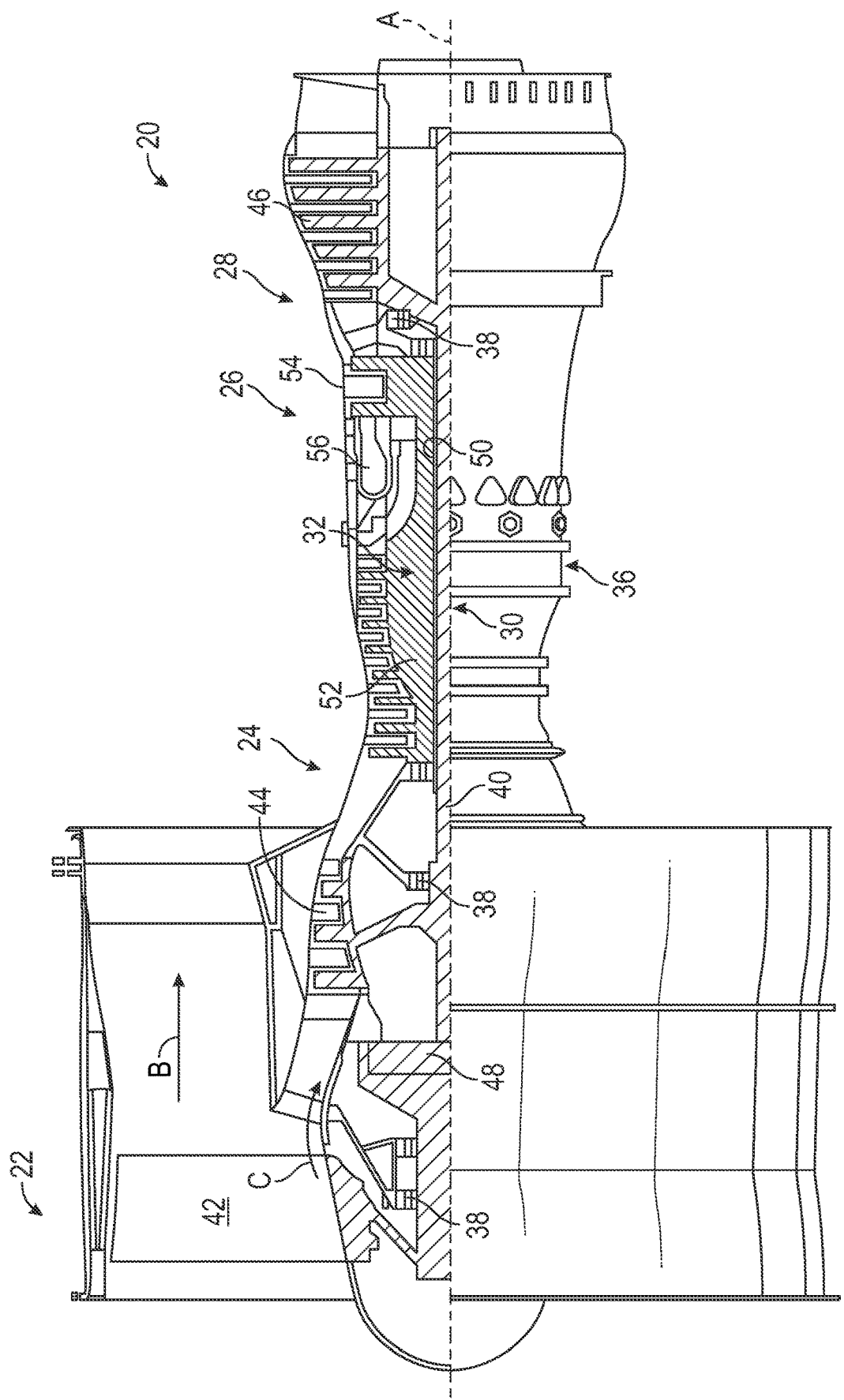
FIG. 1 is a partial cross-sectional view of an exemplary embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
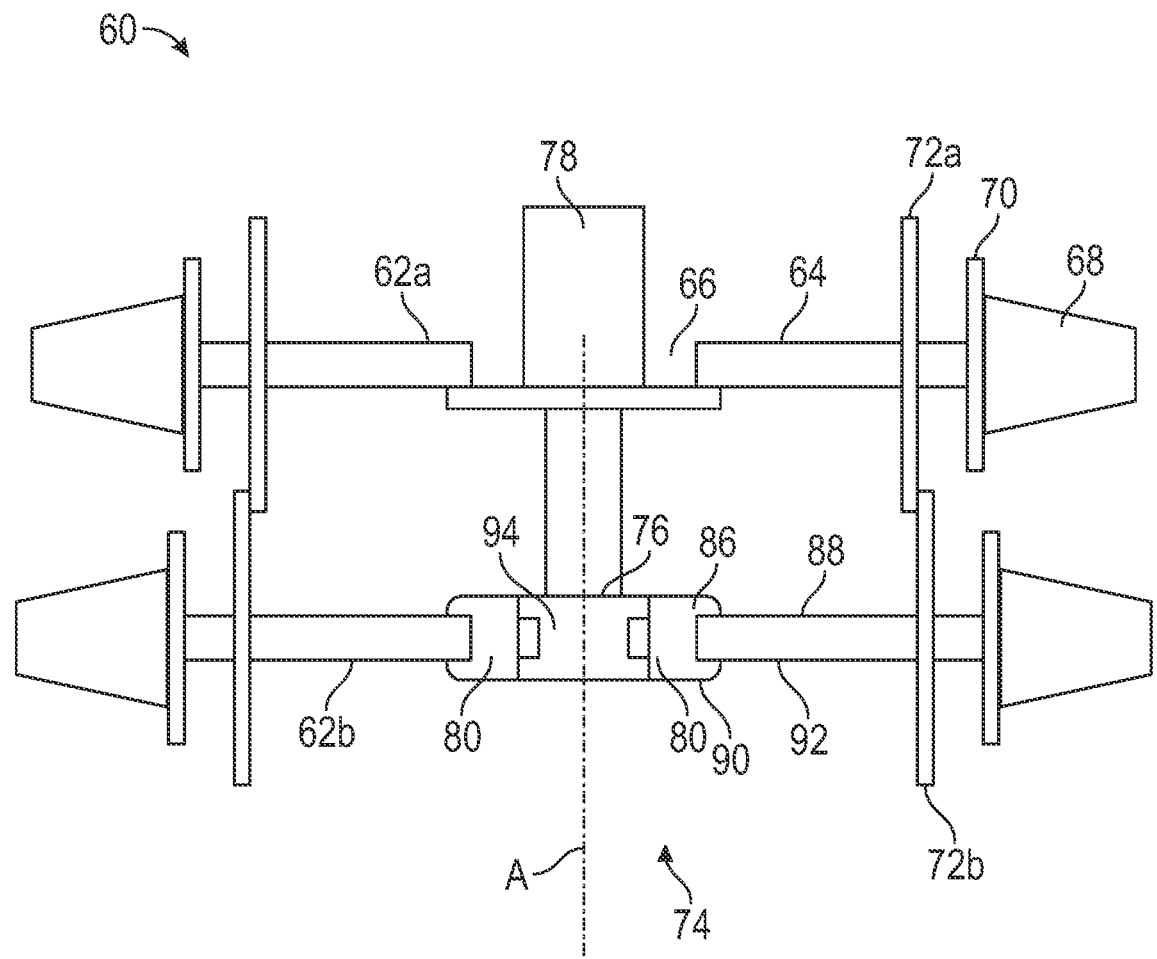
FIG. 2 is a partial cross-sectional view of an embodiment of a compressor rotor of a gas turbine engine with a disassembly tooling installed thereto.

FIG. 2 is a partial cross-sectional view of an embodiment of a rotor assembly 60 of a high pressure compressor 52. While the rotor assembly 60 illustrated is a high pressure compressor 52 rotor assembly 60, one skilled in the art will readily appreciate that the present disclosure may be similarly applied to other portions of the gas turbine engine 20, for example, the low pressure compressor 44, the high pressure turbine 54, or the low pressure turbine 46. The rotor assembly 60 includes a plurality of rotors 62 stacked along the engine central longitudinal axis A. The rotors 62 each include a rotor disk 64 having an opening at the engine central longitudinal axis A defining a rotor bore 66. A plurality of rotor blades 68 extend from a rotor platform 70 located at an outer periphery of the rotor disk 64. In some embodiments, at least one of the rotors 62 is an integrally bladed rotor (IBR), where the rotor blades 68 are formed integral to the rotor disk 64 as a unitary component.

The axially adjacent rotors 62 of the rotor assembly 60 are secured to each other at least partially by an interference fit condition or snap fit condition defined between a first rotor flange 72a of a first rotor 62a and a second rotor flange 72b of a second rotor 62b. During service or repair of the gas turbine engine 20, and in particular the rotor assembly 60, it is often desired or necessary to disassembly the rotor assembly 60 by destacking or unstacking of the rotors 62, so that the destacked rotors 62 may be individually inspected or serviced. To destack the rotors 62, an axial force must be applied to the first rotor 62a and reacted at the second rotor 62b to overcome the interference fit between the two rotors 62a and 62b, thus releasing the first rotor 62a from the second rotor 62b. To achieve this, a disassembly tool 74 is installed to the second rotor 62b at the rotor bore 66 and retained thereto, by inserting the disassembly tool 74 through the rotor bore 66 of the first rotor 62a. The disassembly tool 74 provides a reaction surface 76 for a force application device such as a pneumatic ram 78 operably connected to the first rotor 62a that, when energized applies a force to disconnect the first rotor 62a from the second rotor 62b.

Figure 3:
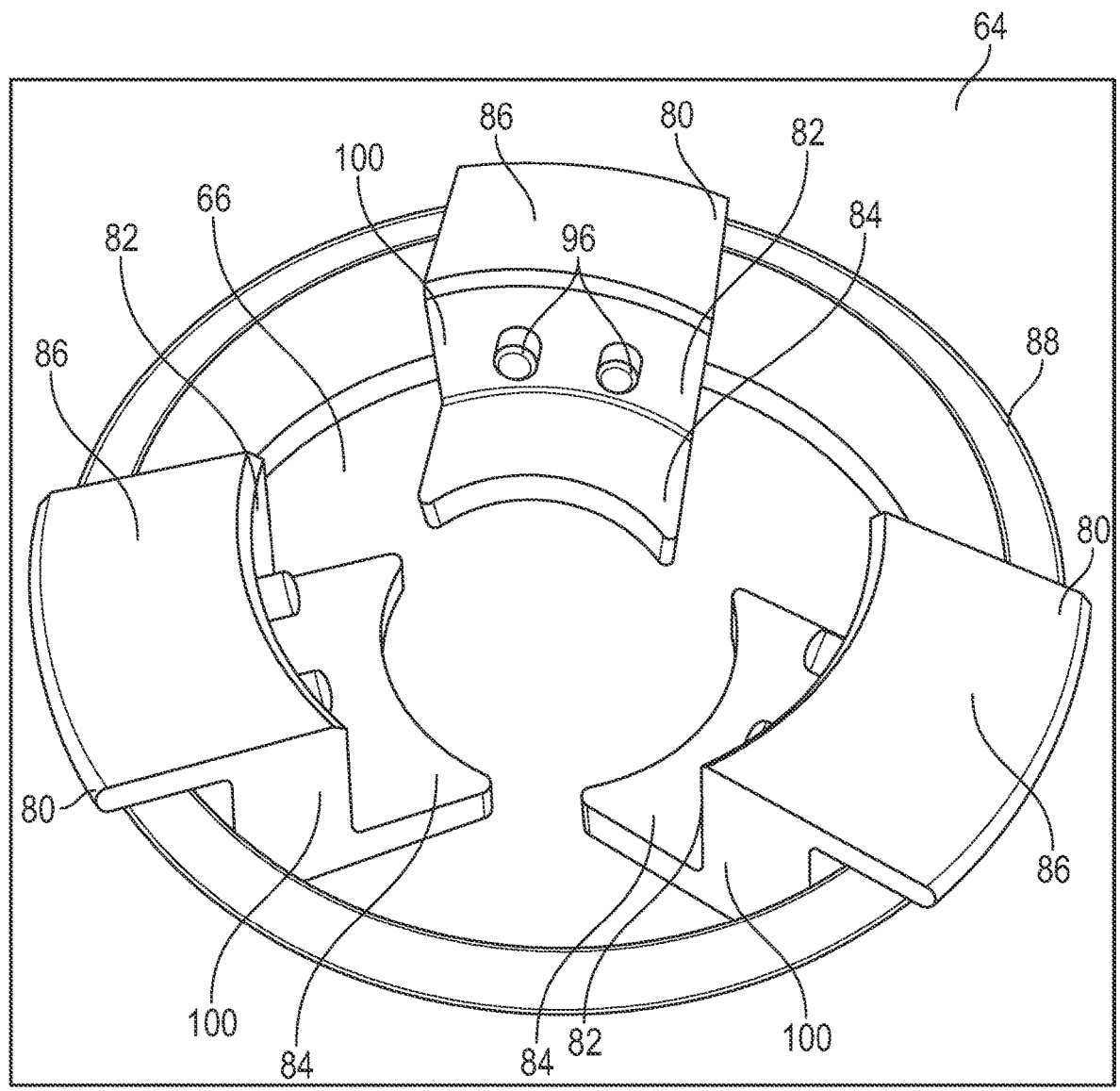
FIG. 3 is a perspective view of an exemplary embodiment of legs of a rotor disassembly tool installed to a rotor.

Referring to FIGS. 3-7, the disassembly tool 74 will be described in more detail. Referring first to FIG. 3, the disassembly tool 74 includes three legs 80 installed to the second rotor 62b at the rotor bore 66. The three legs 80 are spaced apart around a perimeter of the rotor bore 66 and as illustrated in FIG. 3, each leg 80 includes a leg body 100 having radially inner surface 82 and an axial surface 84 located inside the rotor bore 66. To retain the legs 80 at the second rotor 62b, each leg 80 includes a first axial arm 86 extending from the leg body 100 and located at a first axial surface 88 of the rotor disk 64, and a second axial arm 90, shown in FIG. 4 also with reference to FIG. 2, extending from the leg body 100 and located at a second axial surface 92 of the rotor disk 64, opposite the first axial surface 88. The first axial arm 86 and the second axial arm 90 of the legs 80 retain the legs 80, and thus the entire disassembly tool 74 at the rotor bore 66 and prevent the disassembly tool 74 from falling through the rotor bore 66 and potentially damaging one or more of the rotors 62.

Figure 4:
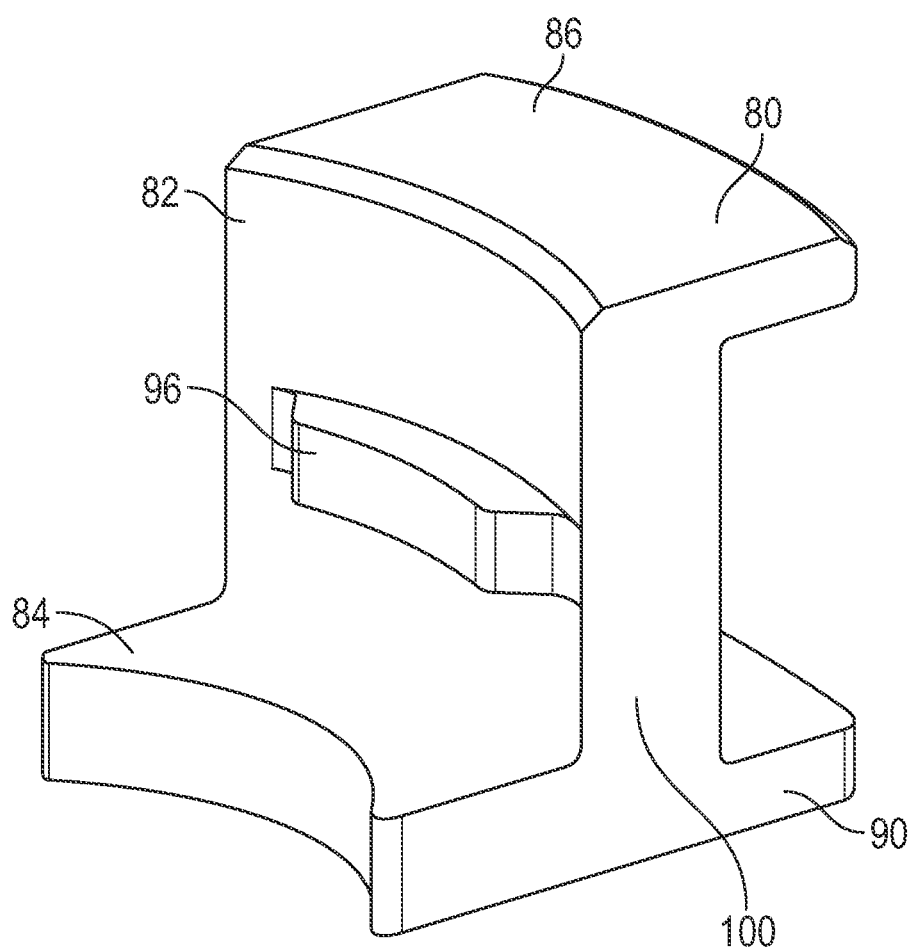
FIG. 4 is a perspective view of an exemplary embodiment of a leg of a rotor disassembly tool.
Figure 5:
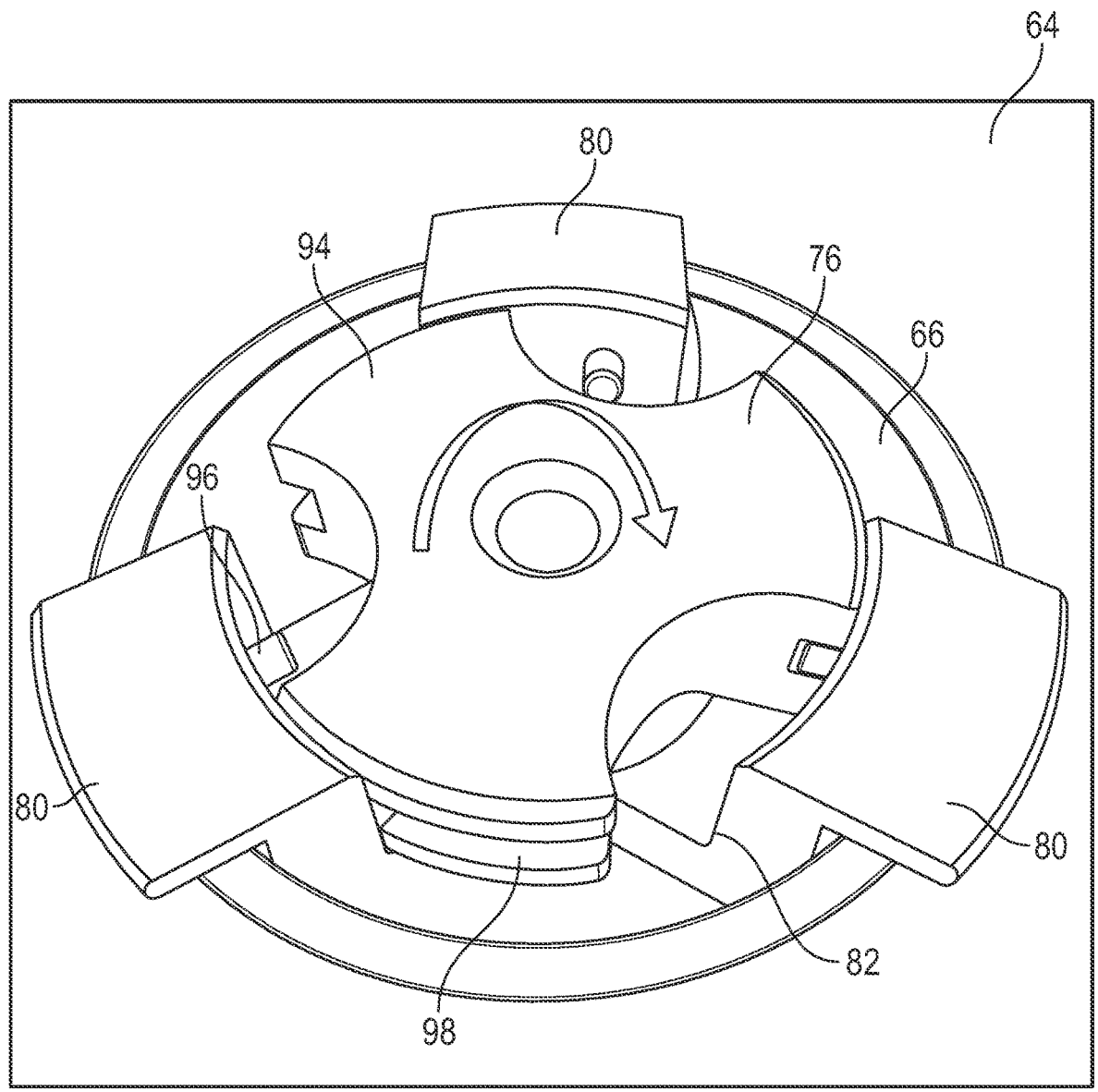
FIG. 5 is a first perspective view of an exemplary embodiment of a rotor disassembly tool including a puck installed to the legs.
Figure 6:
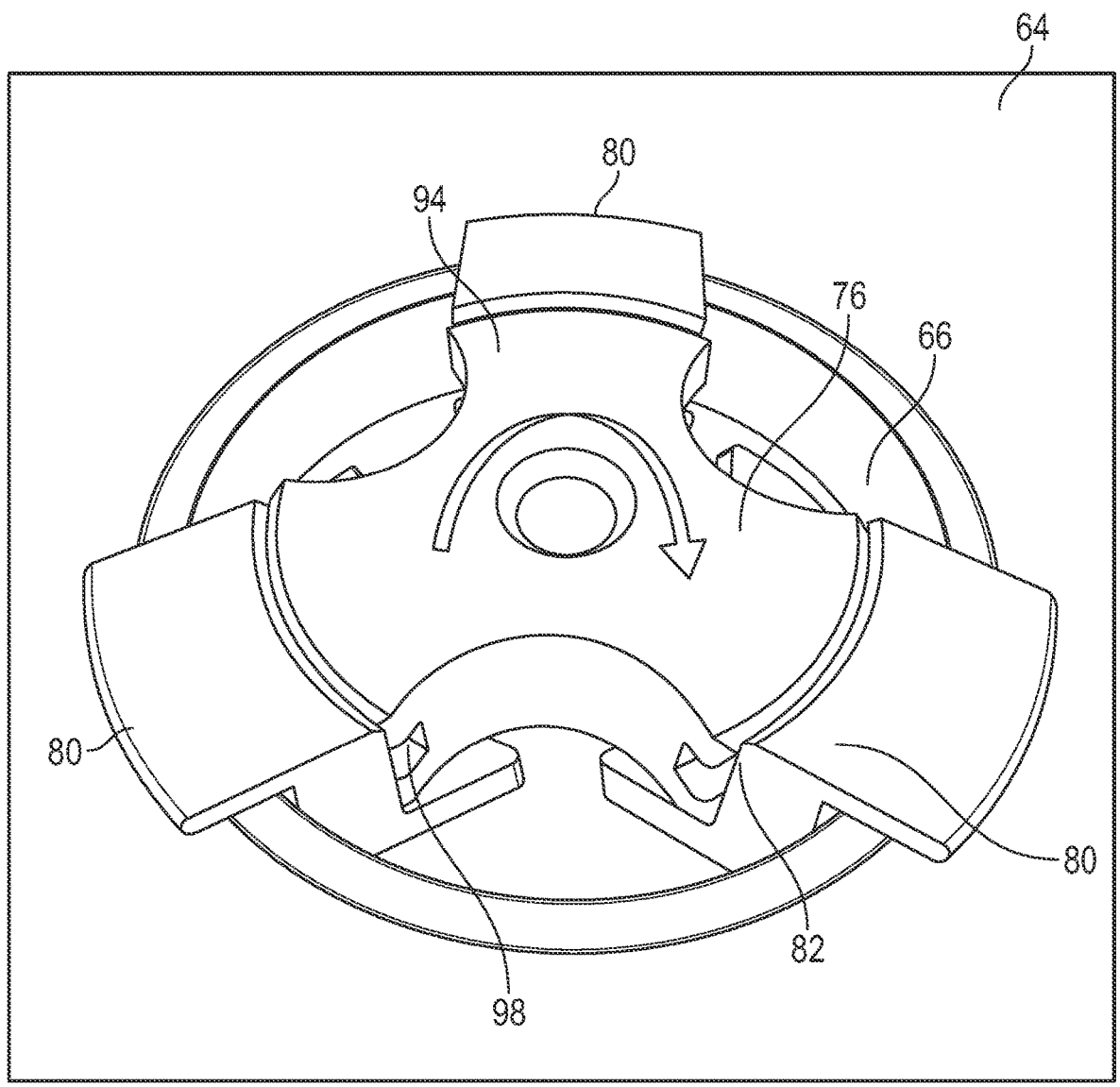
FIG. 6 is a second perspective view of an exemplary embodiment of a rotor disassembly tool including a puck installed to the legs.
Figure 7:
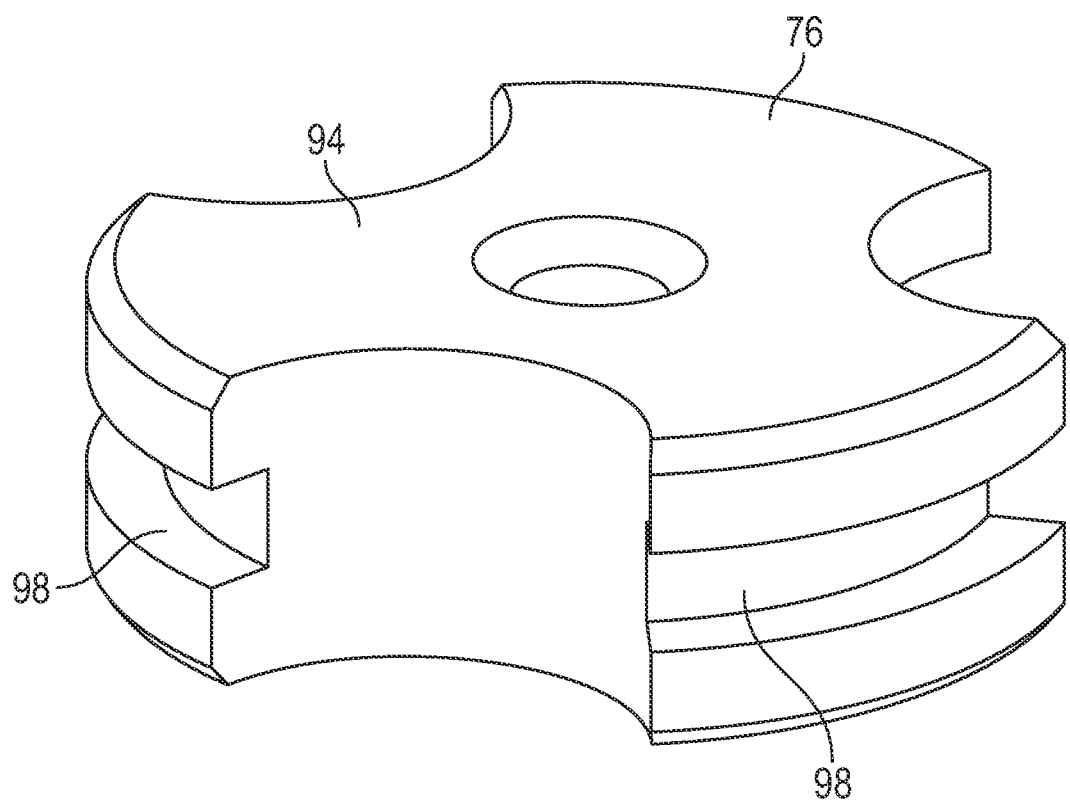
FIG. 7 is a perspective view of an exemplary embodiment of a puck of a rotor disassembly tool.

Referring now to FIG. 5, a puck 94 is installed into the rotor bore 66 and is locked into engagement with the legs 80 by, for example, rotating the puck 94 in the rotor bore 66, as illustrated in FIG. 6. The puck 94 defines the reaction surface 76 at an axial face of the puck 94. Referring again to FIG. 5, to engage the puck 94 with the legs 80, each of the legs 80 includes one or more leg keys 96 that are configured to fit into a puck groove 98 of the puck 94, best shown in FIG. 7, when the puck 94 is rotated in the rotor bore 66. In some embodiments, the leg keys 96 are configured as one or more pins extending radially inwardly from the radially inner surface 82, such as illustrated in FIG. 3. In another embodiment, as illustrated in FIG. 4, the one or more keys 96 may be configured as a circumferentially elongated rib structure extending radially inwardly from the radially inner surface 82. It is to be appreciated, however, that these configurations are merely exemplary and that other configurations of keys 96 are contemplated within the scope of the present disclosure.

The disassembly tool 74 disclosed herein combines several components into one connected and locked assembly, which prevents the tool 74 from liberating during disassembly. This configuration reduces the possibility of damage to the rotors 60 during installation or removal of the disassembly tool 74 and/or destacking of the rotor assembly 60.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A disassembly tool for a rotor assembly of a gas turbine engine, comprising:
   a plurality of legs configured for installation into a rotor bore of a rotor of the rotor assembly, each leg of the plurality of legs including one or more keys configured to extend radially inwardly toward a center of the rotor bore; and
   a puck configured for installation into the rotor bore radially inboard of the plurality of legs, the puck including a plurality of puck arms extending radially outwardly from a puck body, each puck arm including a groove receptive of the one or more keys of a corresponding leg of the plurality of legs to retain the puck to the plurality of legs.

2. The disassembly tool of claim 1, wherein the one or more keys are configured to engage the groove via rotation of the puck in the rotor bore.

3. The disassembly tool of claim 1, wherein each leg of the plurality of legs includes:
   a leg body having a radial inner surface from which the one or more keys extend;
   a first axial arm extending radially outwardly from the leg body and configured to be positioned at a first axial side of the rotor; and
   a second axial arm extending radially outwardly from the leg body and configured to be positioned at a second axial side of the rotor opposite the first axial side, wherein the first axial arm and the second axial arm are configured to retain each leg of the plurality of legs at the rotor.

4. The disassembly tool of claim 3, wherein the leg body further includes an axially facing surface extending radially inwardly from the leg body.

5. The disassembly tool of claim 1, wherein the one or more keys are one or more radially-extending pins or one or more circumferentially elongated ribs.

6. The disassembly tool of claim 1, wherein the puck includes a puck axial surface configured to react a force applied via a disassembly force application device.

7. A disassembly system for disassembly of a first rotor of a rotor assembly of a gas turbine engine from an axially adjacent second rotor of the rotor assembly, comprising:
a disassembly tool including:
a plurality of legs configured for installation through a first rotor bore of the first rotor and further configured to be secured at a second rotor bore of the second rotor, each leg of the plurality of legs including one or more keys configured to extend radially inwardly toward a center of the second rotor bore; and
a puck configured for installation into the second rotor bore radially inboard of the plurality of legs, the puck including a plurality of puck arms extending radially outwardly from a puck body, each puck arm including a groove receptive of the one or more keys of a corresponding leg of the plurality of legs to retain the puck to the plurality of legs; and
a disassembly force application device configured to be operably connected to the first rotor, and further configured to be operably connected to the second rotor at the puck, the disassembly force application device configured to apply an axial force to remove the first rotor from the second rotor.

8. The disassembly system of claim 7, wherein the disassembly force application device is a pneumatic ram.

9. The disassembly system of claim 7, wherein the one or more keys are configured to engage the groove via rotation of the puck in the rotor bore.

10. The disassembly system of claim 7, wherein each leg of the plurality of legs includes:
a leg body having a radial inner surface from which the one or more keys extend;
a first axial arm extending radially outwardly from the leg body and configured to be positioned at a first axial side of the rotor; and
a second axial arm extending radially outwardly from the leg body and configured to be positioned at a second axial side of the rotor opposite the first axial side, wherein the first axial arm and the second axial arm are configured to retain each leg of the plurality of legs at the rotor.

11. The disassembly system of claim 10, wherein the leg body further includes an axially facing surface extending radially inwardly from the leg body.

12. The disassembly system of claim 7, wherein the one or more keys are one or more radially-extending pins or one or more circumferentially elongated ribs.

13. The disassembly system of claim 7, wherein the puck includes a puck axial surface configured to react a force applied via the disassembly force application device.

* * * * *